(12) United States Patent
Ebisawa

(10) Patent No.: US 7,463,785 B2
(45) Date of Patent: Dec. 9, 2008

(54) IMAGE PROCESSING SYSTEM

(75) Inventor: Takashi Ebisawa, Ami-machi (JP)

(73) Assignee: Riso Kagaku Corporation, Tokyo (JP)

( * ) Notice: Subject to any disclaimer, the term of this patent is extended or adjusted under 35 U.S.C. 154(b) by 808 days.

(21) Appl. No.: 10/660,683

(22) Filed: Sep. 12, 2003

(65) Prior Publication Data
US 2004/0052428 A1 Mar. 18, 2004

(30) Foreign Application Priority Data
Sep. 12, 2002 (JP) ............................ 2002-266317

(51) Int. Cl.
G06K 9/40 (2006.01)
(52) U.S. Cl. ...................................... 382/266
(58) Field of Classification Search ................ 382/273, 382/275, 274, 271, 266, 264, 263, 256, 258; 358/462
See application file for complete search history.

(56) References Cited

U.S. PATENT DOCUMENTS

| 5,548,145 | A | * | 8/1996 | Hamamoto et al. | ......... 257/301 |
| 5,548,415 | A | * | 8/1996 | Tanaka et al. | ................ 358/462 |
| 5,583,949 | A | * | 12/1996 | Smith et al. | ................. 382/199 |
| 5,751,854 | A | * | 5/1998 | Saitoh et al. | ................ 382/218 |
| 5,774,578 | A | * | 6/1998 | Shimizu | ..................... 382/170 |
| 5,946,416 | A | * | 8/1999 | Akagi et al. | ................ 382/194 |
| 6,175,659 | B1 | * | 1/2001 | Huang | ........................ 382/266 |
| 6,707,953 | B1 | * | 3/2004 | Iida | ............................. 382/273 |
| 6,750,986 | B1 | * | 6/2004 | Yang | .......................... 358/462 |
| 6,917,446 | B2 | * | 7/2005 | Tanaka et al. | ................ 358/1.9 |
| 2002/0008879 | A1 | * | 1/2002 | Morimatsu | .................. 358/1.9 |

FOREIGN PATENT DOCUMENTS

| JP | 05-136999 | * | 6/1993 |
| JP | 10-240929 | * | 9/1998 |
| JP | 10-240929 | A | 9/1998 |
| JP | 11-150659 | * | 6/1999 |

* cited by examiner

Primary Examiner—Jayesh A Patel
(74) Attorney, Agent, or Firm—Matthew K. Ryan; Thomas F. Presson; Frommer, Lawrence & Haug LLP

(57) ABSTRACT

In an image processing system, whether relevant pixels in the character image information obtained by reading an original on which characters have been recorded are object pixels to be subjected to enhancement processing is determined. The relevant pixel is determined to be an object pixel when the density of the relevant pixel is not lower than a first threshold value higher than the density of the background of the border of the original and not higher than the density of a thinnest line in lines which form the characters and is not higher than a second threshold value not lower than the density of a thinnest line in lines which form the characters and the relevant pixel is determined to be a thin line pixel forming a part of a thin line image.

3 Claims, 7 Drawing Sheets

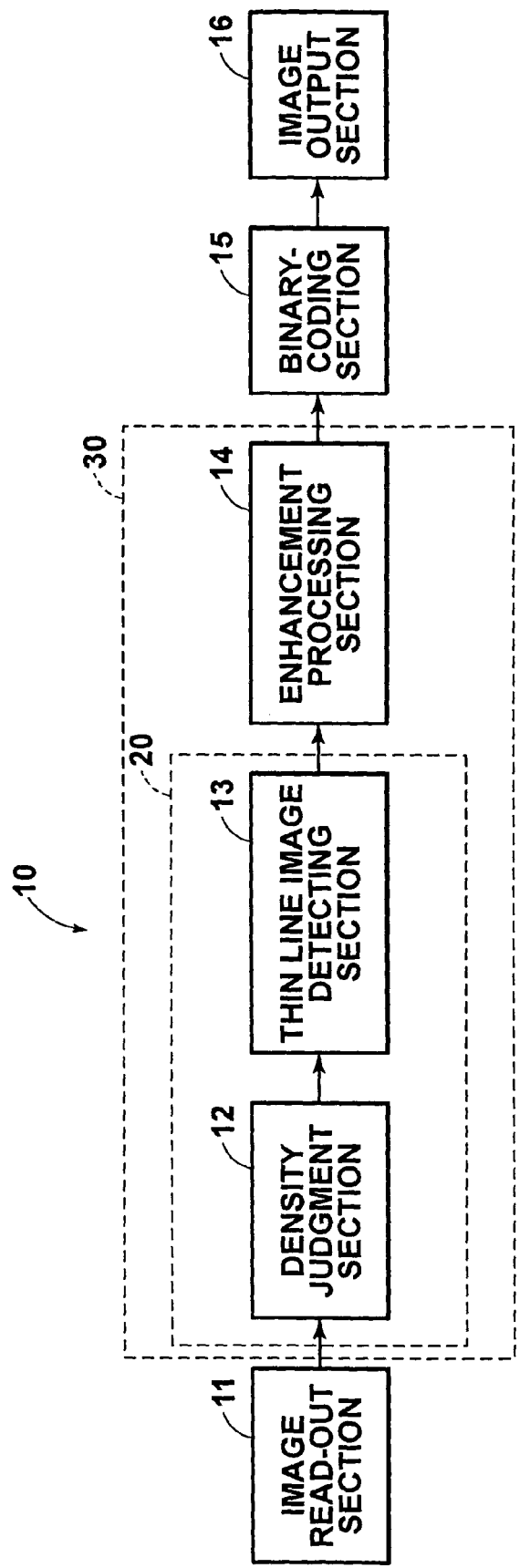

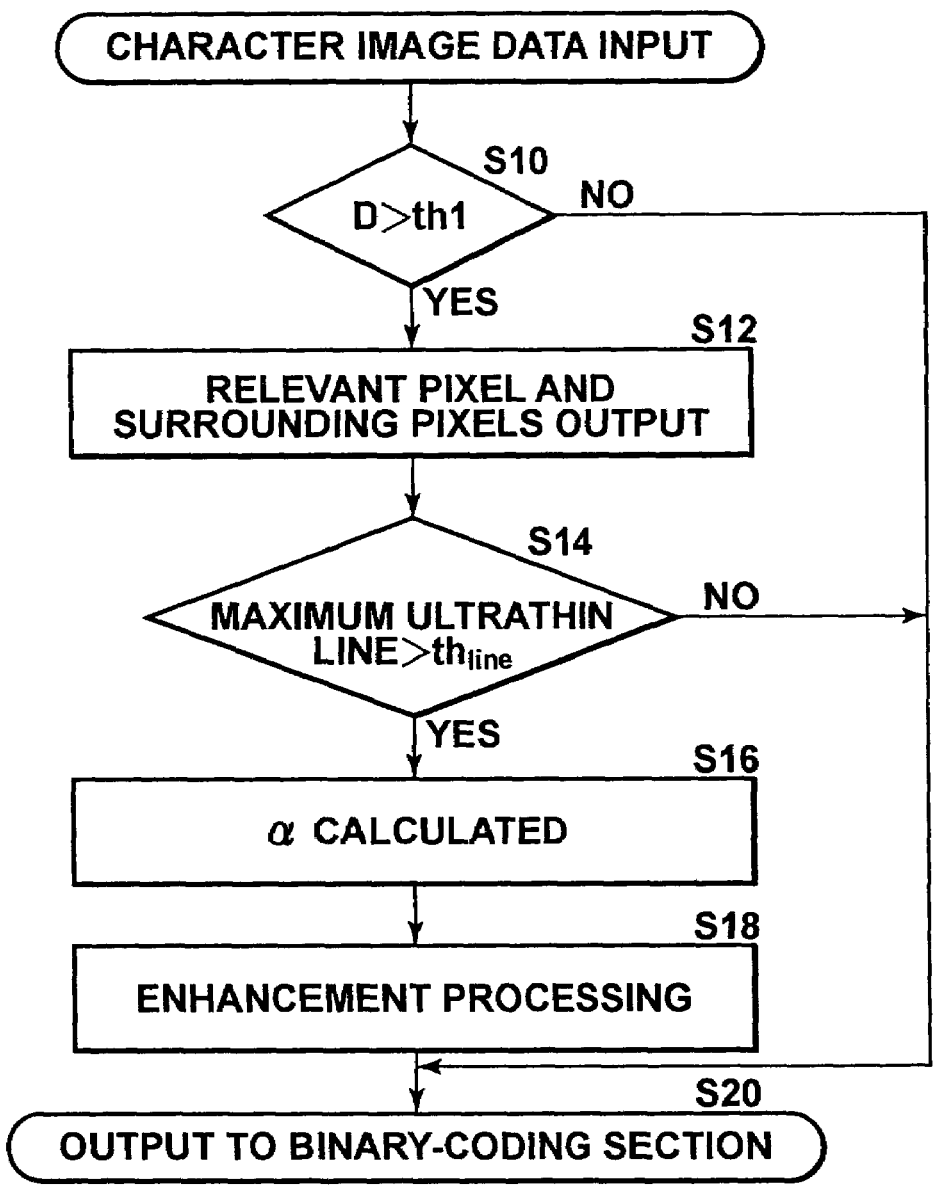

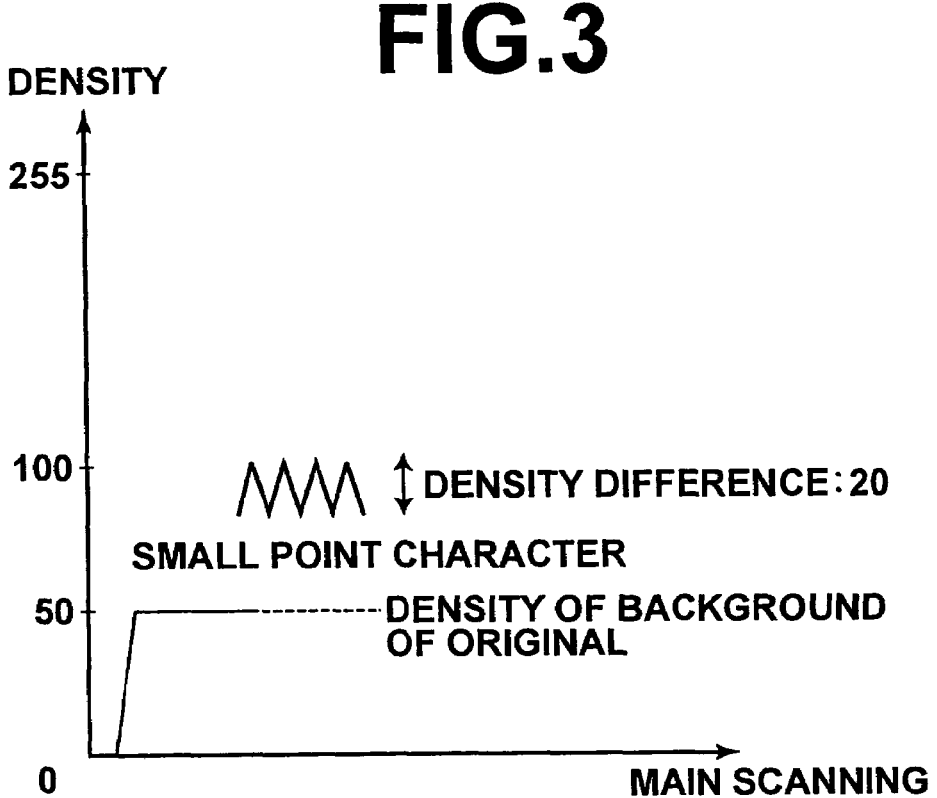

| -1 | 2 | -1 |
|---|---|---|
| -1 | 2 | -1 |
| -1 | 2 | -1 |

| -1 | -1 | -1 |
|---|---|---|
| 2 | 2 | 2 |
| -1 | -1 | -1 |

| 2 | -1 | -1 |
|---|---|---|
| -1 | 2 | -1 |
| -1 | -1 | 2 |

| -1 | -1 | 2 |
|---|---|---|
| -1 | 2 | -1 |
| 2 | -1 | -1 |

IMAGE PROCESSING SYSTEM

BACKGROUND OF THE INVENTION

1. Field of the Invention

This invention relates to an image processing system which determines whether relevant pixels in a character image information obtained by reading an original on which characters have been recorded are object pixels to be subjected to enhancement processing (will be sometimes simply referred to as "object pixels", hereinbelow) and carries out enhancement processing on pixels determined to be object pixels in sequence, thereby carrying out edge enhancement processing on the character image information.

2. Description of the Related Art

There has been proposed a technology of image processing in which character image information is obtained by reading an original, on which characters have been recorded, with a scanner or the like, whether relevant pixels in the character image information are object pixels to be subjected to enhancement processing is determined and enhancement processing is carried out on pixels determined to be object pixels, whereby edge enhancement processing is carried out on the character image information. By taking edge pixels (which are on the edge of a character) as the object pixels and carrying out enhancement processing on the edge pixels, a sharper character image can be output on the basis of the character image information.

Prior to carrying out the edge enhancement processing on the character image information, it is necessary to determine which pixel is an edge pixel. In Japanese Unexamined Patent Publication No. 10(1998)-240929, there is disclosed a method of determining which pixel is an edge pixel in which a difference in density between a relevant pixel and surrounding pixels is obtained and it is determined that the relevant pixel is an edge pixel when the difference is not smaller than a threshold value.

However the difference in density is smaller in character image information obtained by reading small point characters than in character image information obtained by reading large point characters as shown in FIG. 10. FIG. 10 schematically shows densities of pixels output when reading a part of a given character in the main scanning direction, for instance, with a scanner, the mountains showing the densities of parts corresponding to parts of the character and the valleys showing the densities of parts corresponding to parts of the background of the character. Accordingly, in order to distinguish the edge pixels on the edge of small point characters by the method disclosed in Japanese Unexamined Patent Publication No. 10(1998)-240929, it is necessary to set the threshold value smaller than the difference in density in character image information obtained by reading small point characters. However, since the difference in density in character image information obtained by reading small point characters is small and can be smaller than the difference between the density of the background of the edge portion of the original and the density of the outside of the original. In such a case, if the threshold value is set smaller than the difference in density in character image information obtained by reading small point characters, pixels on the border of the original can be also determined to be edge pixels and a line representing the edges of the original can be output.

In Japanese Patent No. 3115065, there is disclosed a method of determining which pixel is an edge pixel in which since pixels on the edge of a character in character image information obtained by reading small point characters generally have an intermediate density, the threshold value is set smaller when the relevant pixel is of an intermediate density and otherwise set at an ordinary value. However, this approach is disadvantageous in that pixels on the edge of the small point character cannot be distinguished from pixels on the border of the original since the intermediate density is defined without taking into account the density of the background of the edge portion of the original.

Though it is possible to enhance the edge pixels to such an extent that the contour of the original cannot be output, this approach is disadvantageous in that small point characters cannot be clearly output.

SUMMARY OF THE INVENTION

In view of the foregoing observations and description, the primary object of the present invention is to provide an image processing system which can carry out edge enhancement processing on a character image information including therein small point characters so that the small point characters can be sharply output with a contour of the original not output.

In accordance with the present invention, there is provided an image processing system which comprises an object pixel detecting means which determines whether relevant pixels in the character image information obtained by reading an original on which characters have been recorded are object pixels to be subjected to enhancement processing and carries out enhancement processing on pixels determined to be object pixels, thereby carrying out edge enhancement processing on the character image information, wherein the improvement comprises that the object pixel detecting means comprises a density judgment section which determines the relevant pixel to be a prospective object pixel when the density of the relevant pixel is not lower than a first threshold value higher than the density of the background of the border of the original and not higher than the density of a thinnest line in lines which form said characters and is not higher than a second threshold value not lower than the density of a thinnest line in lines which form said characters, and a thin line image detecting section which determines the relevant pixel to be a thin line pixel forming a part of a thin line image, and determines that the relevant pixel is an object pixel when the density judgment section determines the relevant pixel to be a prospective object pixel and the thin line image detecting section determines the relevant pixel to be a thin line pixel.

The "relevant pixel" is a pixel of interest in the character image information.

The "edge enhancement processing" may be of any type and may be, for instance, Laplacian edge enhancement processing.

The "second threshold value" may be any value so long as it is not lower than the density of a thinnest line in lines which form said characters. For example, the second threshold value may be a maximum of densities of lines which form said characters so that the density judgment section determines to be a prospective object pixel all the relevant pixels whose density is not lower than the first threshold value.

The "thin line image" means an image which extends in a predetermined direction in a one to several pixel width, which may be determined to any value as desired.

Further, non-object pixels (relevant pixels which have not been determined to be an object pixel) may be subjected to a weak enhancement processing the degree of enhancement of which is weaker than that of the enhancement processing for said edge enhancement processing.

Further, it is possible to carry out a weak enhancement processing on anon-object pixel when the difference in density between the non-object pixel and one or more surrounding pixels adjacent to the non-object pixel is not smaller than a predetermined third threshold value and not to carry out the weak enhancement processing when the difference in density is smaller than the third threshold value.

In the image processing system of the present invention, since the relevant pixel is determined to be an object pixel only when the density judgment section determines the relevant pixel to be a prospective object pixel and the thin line image detecting section determines the relevant pixel to be a thin line pixel, and the enhancement processing is carried out on the object pixel thus determined, edge enhancement processing can be carried out on a character image information including therein small point characters so that the small point characters can be sharply output without a fear that a contour of the original is output. That is, since a relevant pixel is not determined to be an object pixel unless the relevant pixel is a thin line pixel, pixels in the border of the original which conventionally can be determined to be object pixels due to, for instance, a slight change in density of the background cannot be determined to be object pixels, enhancement processing can be carried out only on pixels defining the edge of a character and accordingly, the contour of the original cannot be output. At the same time, carrying out enhancement processing on unnecessary pixels can be avoided.

Further, when a weak enhancement processing is carried out on non-object pixels, the overall image recorded on the original can be clearly output even if the character image information is poor in sharpness due to, for instance, that the lens employed in obtaining the character image information is poor in performance and cheap.

Further, if a weak enhancement processing is carried out on non-object pixels when the difference in density between the non-object pixel and one or more surrounding pixels adjacent to the non-object pixel is not smaller than a predetermined third threshold value and is not carried out when the difference in density is smaller than the third threshold value, the overall image recorded on the original can be more clearly output.

BRIEF DESCRIPTION OF THE DRAWINGS

FIG. 1 is a block diagram showing a character image reading/output system employing an image processing system in accordance with an embodiment of the present invention, FIG. 2 is a flow chart for illustrating an example of edge enhancement processing to be carried out in the character image reading/output system shown in FIG. 1, FIG. 3 is a view illustrating an example of a read density of a small point character, FIG. 4 is a view illustrating the surrounding pixels.

DESCRIPTION OF THE PREFERRED EMBODIMENT

Figures 5A, 5B, 5C:
FIGS. 5A to 5C are views for illustrating thin line detecting filters.

A character image reading/output system employing an image processing system in accordance with an embodiment of the present invention will be described with reference to the drawings, hereinbelow. FIG. 1 is a block diagram showing the character image reading/output system.

The character image reading/output system 10 comprises an image read-out section 11 which obtains character image data by reading an original on which characters have been recorded, an image processing system 30 which determines whether relevant pixels in the character image data obtained by the image read-out section 11 are object pixels to be subjected to enhancement processing and carries out enhancement processing on pixels determined to be object pixels, thereby carrying out edge enhancement processing on the character image data, a binary-coding section 15 which binary-codes the character image data after it has been subjected to the edge enhancement processing by the image processing system 30, thereby obtaining binary-coded character image data, and an image output section 16 which outputs a character image on a predetermined recording medium on the basis of the binary-coded character image data.

The image processing system 30 comprises an object pixel detecting section 20 which determines whether relevant pixels in the character image data obtained by the image read-out section 11 are object pixels to be subjected to enhancement processing and an enhancement processing section 14 which carries out enhancement processing on pixels determined to be object pixels by the object pixel detecting section 20.

The object pixel detecting section 20 comprises a density judgment section 12 which determines the relevant pixel to be a prospective object pixel when the density of the relevant pixel is not lower than a first threshold value higher than the density of the background of the border of the original and not higher than the density of a thinnest line in lines which form said characters and is not higher than a second threshold value not lower than the density of a thinnest line in lines which form said characters, and a thin line image detecting section 13 which determines whether the relevant pixel which has been determined to be a prospective object pixel by the density judgment section 12 is a thin line pixel forming a part of a thin line image.

Operation of the character image reading/output system will be described next.

First the image read-out section 11 photoelectrically reads an original on which characters are recorded, thereby obtaining character image data. The character image data is input into image processing system 30. The image processing system 30 processes the character image data according to the flow chart shown in FIG. 2. That is, the density judgment section 12 selects a predetermined pixel out of the pixels in the character image data, and judges whether the density D of the relevant pixel is higher than a preset first threshold value th1. (step S10) The first threshold value th1 is higher than the density of the background of the border of the original and not higher than the density of a thinnest line in lines which form the characters. For example, when the read density of the small point characters is as shown in FIG. 3, the first threshold value th1 is set to about 90, a value between the density at a part corresponding to the character and a part corresponding to the background of the character. FIG. 3 shows in 8-bit data the density of pixels output when a part of a predetermined small point character is read in the main scanning direction by the image read-out section 11 (the read density of a white part is taken as 0 and the read density of a black part is taken as 255).

When the density of the relevant pixel is not higher than the first threshold value th1, the pixel data of the relevant pixel is output to the binary coding section 15 as it is (step S20). Whereas when the density of the relevant pixel is higher than the first threshold value th1, the relevant pixel is determined to be a prospective object pixel (in this particular embodiment, the second threshold value as cited in Claim 1 is set to a maximum of densities of lines which form said characters) and pieces of the pixel data of the prospective object pixel and the surrounding pixels thereof (pixels surrounding the prospective object pixel) are output to the thin line image detecting section 13. The surrounding pixels of a relevant pixel are pixels adjacent to the relevant pixel. For example, when the relevant pixel is pixel E in FIG. 4, the surrounding pixels of the relevant pixel are pixels A, B, C, D, F, G, H and I. Then the thin line image detecting section 13 calculates ultrathin line values by the use of a vertical thin line detecting filter, a horizontal thin line detecting filter and oblique thin line detecting filters respectively shown in FIGS. 5A to 5c on the basis of pieces of pixel data of the prospective object pixel and its surrounding pixels. The filters shown in FIGS. 5A to 5C show coefficients by which the image data of the corresponding pixels are to be multiplied. The "ultrathin line value" is the sum of the pieces of the pixel data of the prospective object pixel and its surrounding pixels multiplied by the corresponding coefficients. For example, assuming that a to i represent pieces of image data of pixels A to I, the ultrathin line value for the vertical thin line detecting filter is 2×(b+e+h)−(a+d+g+c+f+i).

In the manner described above, ultrathin line values for the respective thin line detecting filters are calculated and the maximum of the ultrathin line values is obtained. Then the maximum ultrathin line value is compared with a preset threshold value $th_{line}$ for detecting the thin line image. (step S14) When the former is larger than the latter, the prospective object pixel is determined to be a thin line pixel. When a relevant pixel is determined to be a prospective object pixel and at the same time is determined to be a thin line pixel, it is determined that the relevant pixel is an object pixel, and the pixel data of the object pixel and the maximum ultrathin line value are output to the enhancement processing section 14. The enhancement processing section 14 calculates a degree of enhancement α. (step S16) The degree of enhancement α is set to such a value that characters of the smallest point in the characters output from the character image reading/output system can be clearly output. Though may be a fixed value, the degree of enhancement α is set to a value proportional to the maximum ultrathin line value in this embodiment. The object pixel is enhanced by the use of the degree of enhancement α set in the manner described above. (step S18) The enhancement processing may be carried out, for instance, by the use of a high frequency-band enhancement filter such as a general Laplacian filter represented by the following formula (1).

$$g(i,j)=f(i,j)-\alpha \cdot \nabla^2 f(i,j) \quad (1)$$

wherein, f(i,j) represents pixel data before the enhancement processing and g(i,j) represents pixel data after the enhancement processing.

The pixel data of the object pixels thus enhanced are output to the binary-coding section 15. (step S20) When it is determined in step S14 that the maximum ultrathin line value is not larger than the preset threshold value $th_{line}$, the relevant pixel is determined not to be an object pixel and the pixel data of the relevant pixel is output to the binary coding section 15 as it is (step S20).

Taking all the pixels in the character image data output from the image read-out section 11 as the relevant pixel in sequence, the same processing is carried out, and the binary-coding section 15 binary-codes all the pieces of the pixel data. The binary-coded pixel data is output to the image output section 16 which outputs a character image on a predetermined recording medium on the basis of the binary-coded character pixel data.

In the character image reading/output system 10 described above, since the relevant pixel is determined to be an object pixel only when the density judgment section 12 determines the relevant pixel to be a prospective object pixel and the thin line image detecting section 13 determines the relevant pixel to be a thin line pixel, and the enhancement processing is carried out on the object pixel thus determined, edge enhancement processing can be carried out on a character image information including therein small point characters so that the small point characters can be sharply output without a fear that a contour of the original is output.

Figure 6:
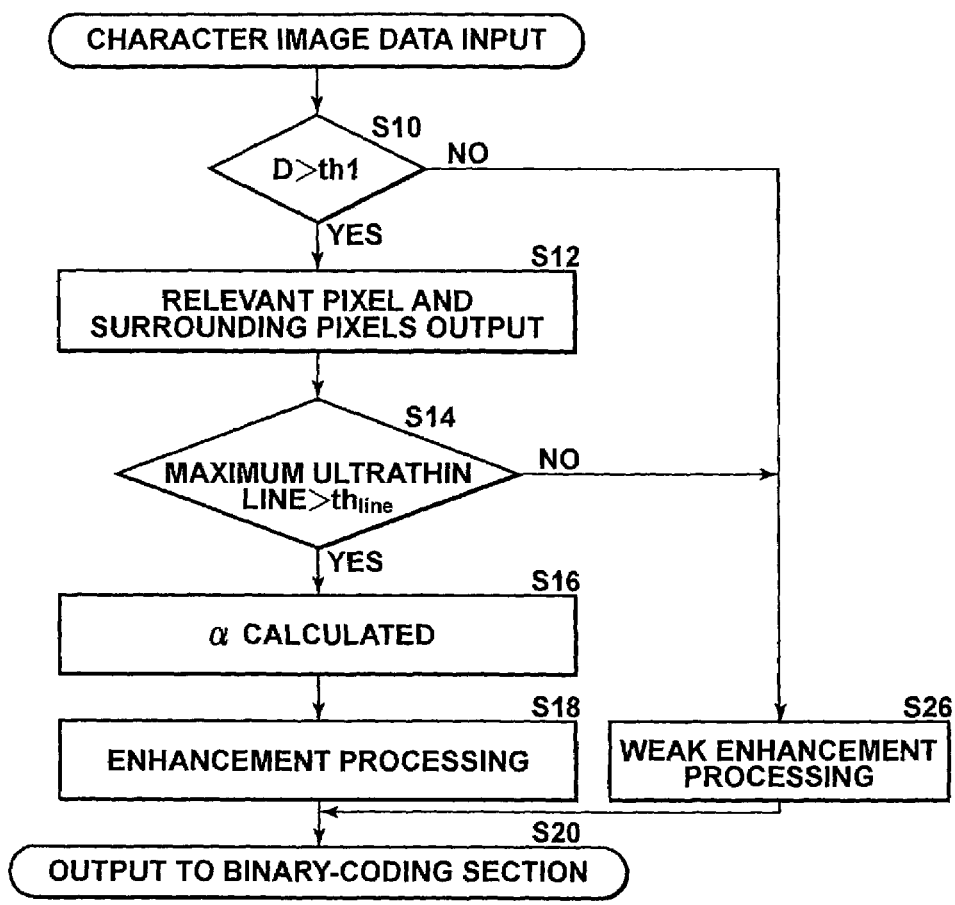
FIG. 6 is a flow chart for illustrating another example of edge enhancement processing to be carried out in the character image reading/output system shown in FIG. 1.
Figure 7:
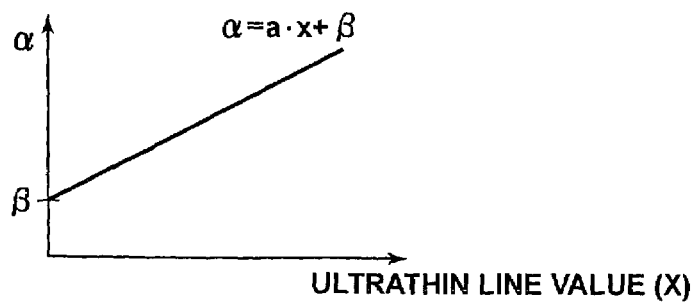
FIG. 7 is a view illustrating the degree of enhancement to be carried out in the flow chart shown in FIG. 6.

Though, in the embodiment described above, when it is determined in step S10 that the density of the relevant pixel is not higher than the first threshold value th1 or when it is determined in step S14 that the maximum ultrathin line value is not larger than the preset threshold value $th_{line}$, the pixel data of the relevant pixel is output to the binary coding section 15 as it is, it is possible to carry out a weak enhancement processing on the relevant pixel as shown in the flow chart shown in FIG. 6. (step S26 in the flow chart shown in FIG. 6) Though the degree of enhancement α in the enhancement processing to be carried out in step S18 and the degree of enhancement β in the enhancement processing to be carried out in step S26 may be fixed values, when the degree of enhancement α in the enhancement processing to be carried out in step S18 and the degree of enhancement β in the enhancement processing to be carried out in step S26 are set so that the relation therebetween is as shown in FIG. 7, appearance of unnaturalness at the border between the part where the ordinary enhancement processing (to be carried out in step S18) is carried out and the part where the weak enhancement processing is carried out. The inclination of the straight line in FIG. 7 can be obtained by image tuning on the basis of the MTF of the image read-out section 11. The relation between α and β may be represented by a curve (a quadratic function) in place of a straight line (a linear function) shown in FIG. 7.

Figure 8:
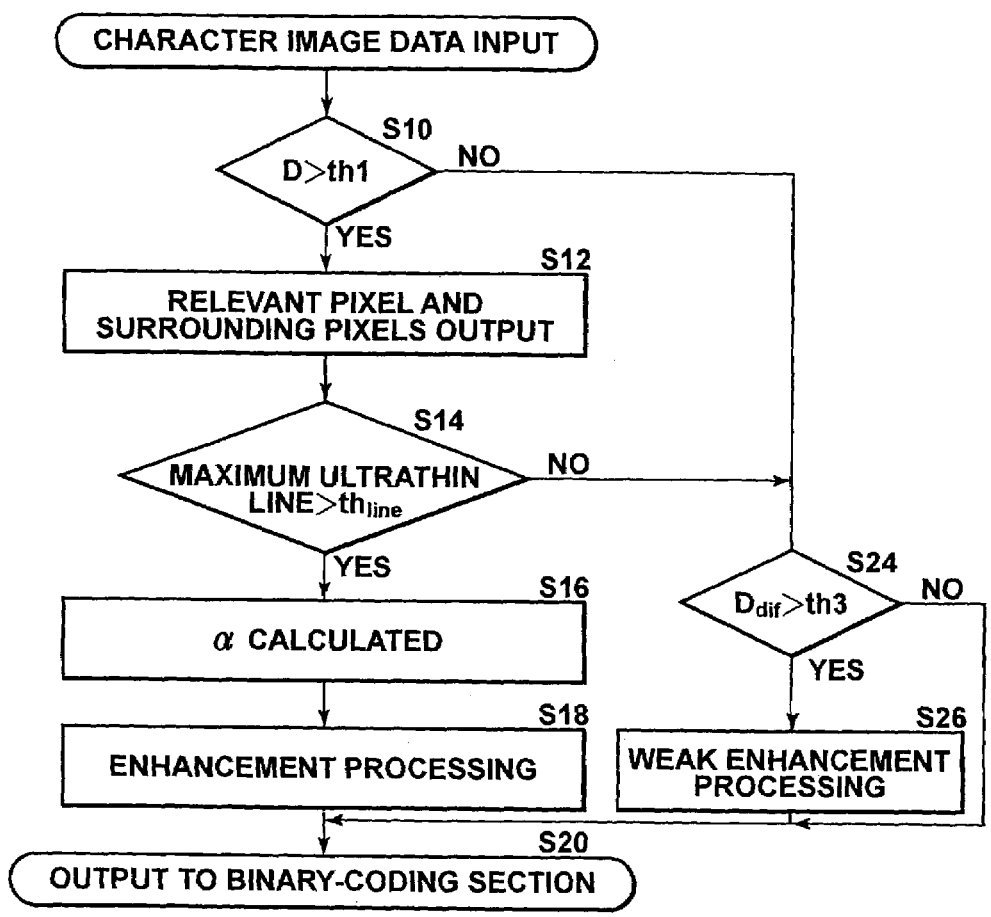
FIG. 8 is a flow chart for illustrating still another example of edge enhancement processing to be carried out in the character image reading/output system shown in FIG. 1.
Figure 9:
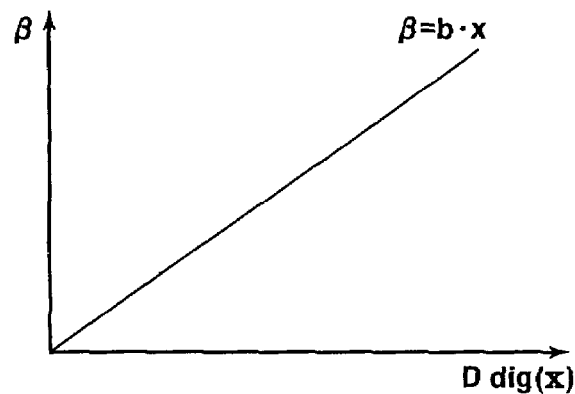
FIG. 9 is a view illustrating the degree of enhancement to be carried out in the flow chart shown in FIG. 8.
Figure 10:
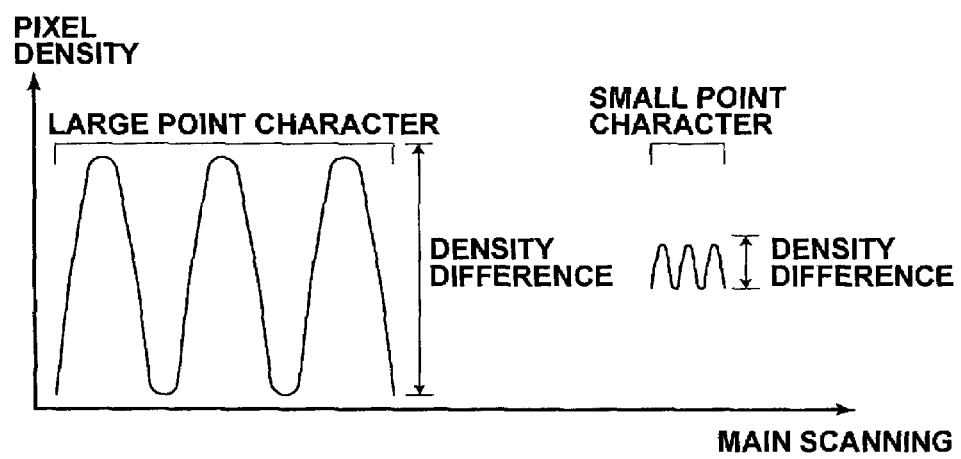
FIG. 10 is a view showing the density differences in a large point character and a small point character.

As shown in the flow chart shown in FIG. 8, when it is determined in step S10 that the density of the relevant pixel is not higher than the first threshold value th1 or when it is determined in step S14 that the maximum ultrathin line value is not larger than the preset threshold value $th_{line}$, it is possible to provide a density difference calculating means (not shown) which calculates the difference in density $D_{dif}$ between the relevant (non-object) pixel and the surrounding pixels adjacent to the relevant pixel and to carry out a weak enhancement processing on the relevant pixel when the difference in density $D_{dif}$ is larger than a predetermined third threshold value th3 (steps S24 and S26) and output the pixel data of the relevant pixel to the binary coding section 15 as it is without carrying out the weak enhancement processing when the difference in density $D_{dif}$ is not larger than the third threshold value th3 (steps S24 and S20). Though may be a fixed value, the degree of enhancement β in the weak enhancement processing may be set to a value proportional to the difference in density as shown in FIG. 9. Further, when the difference in density $D_{dif}$ is not larger than the third threshold value th3, further weaker enhancement processing may be carried out on the relevant pixel. The difference in density $D_{dif}$ between the relevant pixel and the surrounding pixels may be, for instance, the maximum of the differences in density $D_{dif}$ between the relevant pixel and the respective surrounding pixels.

What is claimed is:

1. An image processing system which comprises an object pixel detecting processor which determines whether relevant pixels in the character image information obtained by reading an original on which characters have been recorded are object pixels to be subjected to enhancement processing, and carries out enhancement processing on pixels determined to be object pixels, thereby carrying out edge enhancement processing on the character image information, the object pixel detecting processor comprising:

a density judgment section that determines the relevant pixel to be a prospective object pixel when the density of the relevant pixel is higher than a first threshold value, which is higher than the density of a background of the border of the original and not higher than the density of a thinnest line from among lines that form said characters, and when the density of the relevant pixel is not higher than a second threshold value, which is not lower than the density of the thinnest line from among lines that form said characters; and a thin line image detecting section which determines the relevant pixel to be a thin line pixel forming a part of a thin line image, wherein the object pixel detecting processor determines that the relevant pixel is an object pixel when the density judgment section determines the relevant pixel to be a prospective object pixel, and the thin line image detecting section determines the relevant pixel to be a thin line pixel.

2. An image processing system as defined in claim 1 in which relevant pixels which have not been determined to be an object pixel are subjected to a weak enhancement processing the degree of enhancement of which is weaker than that of the enhancement processing for said edge enhancement processing.

3. An image processing system as defined in claim 1 which further comprises a density difference calculating means which calculates the difference in density between a non-object pixel and the surrounding pixels adjacent to the non-object pixel and carries out a weak enhancement processing on the non-object pixel when the difference in density is larger than a predetermined third threshold value and does not carry out the weak enhancement processing when the difference in density is not larger than the third threshold value.

* * * * *